(12) United States Patent  
Zhang et al.

(10) Patent No.: US 8,307,145 B2
(45) Date of Patent: Nov. 6, 2012

(54) METHOD AND SYSTEM FOR CONNECTING MULTIPLE IDE DEVICES TO A USB APPARATUS USING A SINGLE USB-TO-IDE ADAPTER

(75) Inventors: Zhenyu Zhang, San Jose, CA (US); Scott Guo, San Jose, CA (US)

(73) Assignee: NXP B.V., Eindhoven (NL)

( * ) Notice: Subject to any disclaimer, the term of this patent is extended or adjusted under 35 U.S.C. 154(b) by 645 days.

(21) Appl. No.: 11/577,310

(22) PCT Filed: Oct. 14, 2005

(86) PCT No.: PCT/IB2005/053384
§ 371 (c)(1),
(2), (4) Date: Oct. 16, 2009

(87) PCT Pub. No.: WO2006/040745
PCT Pub. Date: Apr. 20, 2006

(65) Prior Publication Data
US 2010/0030941 A1 Feb. 4, 2010

Related U.S. Application Data

(60) Provisional application No. 60/619,312, filed on Oct. 14, 2004, provisional application No. 60/657,551, filed on Feb. 28, 2005.

(51) Int. Cl.
*G06F 13/36* (2006.01)
(52) U.S. Cl. ........................ 710/315; 710/305
(58) Field of Classification Search .................. 710/315, 710/100, 305–306
See application file for complete search history.

(56) References Cited

U.S. PATENT DOCUMENTS
2002/0002645 A1* 1/2002 Hatano ................ 710/100
2003/0154340 A1* 8/2003 Bolt et al. ............. 710/305
2005/0240691 A1* 10/2005 Yurusov ................ 710/62

FOREIGN PATENT DOCUMENTS
WO 02/41154 A2 5/2002

* cited by examiner

*Primary Examiner* — Brian Misiura
*Assistant Examiner* — Kim Huynh

(57) ABSTRACT

A single USB-to-IDE adapter (204) connects two or more IDE devices (208, 210, 212) to a USB apparatus (202). The USB apparatus (202) communicates with each IDE device using a connection identifier associated with the USB connection (206) and a unique identifier associated with each IDE connection (214, 216, 218). The USB-to-IDE adapter (204) may be integrated within the USB apparatus (202) or as a discrete component connected to the USB apparatus (202).

14 Claims, 5 Drawing Sheets

METHOD AND SYSTEM FOR CONNECTING MULTIPLE IDE DEVICES TO A USB APPARATUS USING A SINGLE USB-TO-IDE ADAPTER

CROSS REFERENCE TO RELATED APPLICATION

This application claims the benefit of U.S. provisional application Ser. No. 60/619,312 filed 2004 Oct. 14, and 60/657,551 filed 2005 Feb. 28, which is incorporated herein whole by reference.

Many electronic devices typically include one or more USB (Universal Serial Bus) connectors or ports. The USB connectors allow the electronic device to connect to a variety of USB devices, such as printers, scanners, and mass storage devices. Communications between the electronic device and a USB mass storage device are governed by various protocols, including the transport protocols included in the USB mass storage device class specification for the USB standard.

Some mass storage devices pre-date the USB standard, such as, for example, devices using the Integrated Drive Electronic (IDE) interface. IDE storage devices are therefore unable to connect directly to an electronic device through a USB connector. A USB-to-IDE adapter is typically used to connect the IDE device to the USB connector.

FIG. 1 is a block diagram of a system according to the prior art. System 100 includes USB apparatus 102 connected to USB hub 104 via cable 106. USB hub 104 connects to USB-to-IDE adapters 108, 110 via cables 112, 114, respectively. IDE device 116 connects to USB-to-IDE adapter 108 via cable 118 while IDE device 120 connects to USB-to-IDE adapter 110 via cable 122. Communications between USB apparatus 102 and IDE devices 116, 120 are facilitated by assigning unique addresses or identifiers to USB connections 112, 114, and to each IDE device 116, 120.

USB apparatus 102 must have multiple USB connectors or use a USB hub (e.g., hub 104) to connect with multiple IDE devices. Moreover, each IDE device needs an individual USB-to-IDE adapter to communicate with USB device 102. The additional USB connectors and individual USB-to-IDE adapters increase the cost and complexity of system 100.

In accordance with the invention, a method and system for connecting multiple IDE devices to a USB apparatus using a single USB-to-IDE adapter are provided. The USB-to-IDE adapter may be integrated within the USB apparatus or as a discrete component connected to the USB apparatus.

The invention will best be understood by reference to the following detailed description of embodiments in accordance with the invention when read in conjunction with the accompanying drawings, wherein.

The following description is presented to enable one skilled in the art to make and use embodiments in accordance with the invention. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 1:
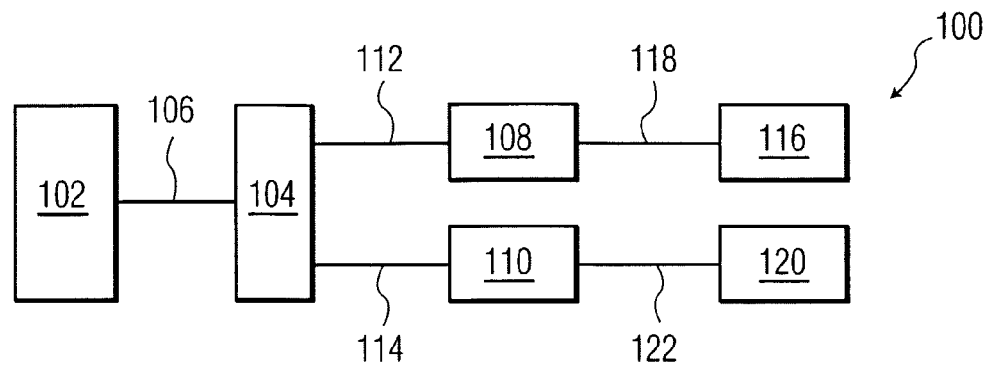
FIG. 1 is a block diagram of a system according to the prior art.
Figure 2:
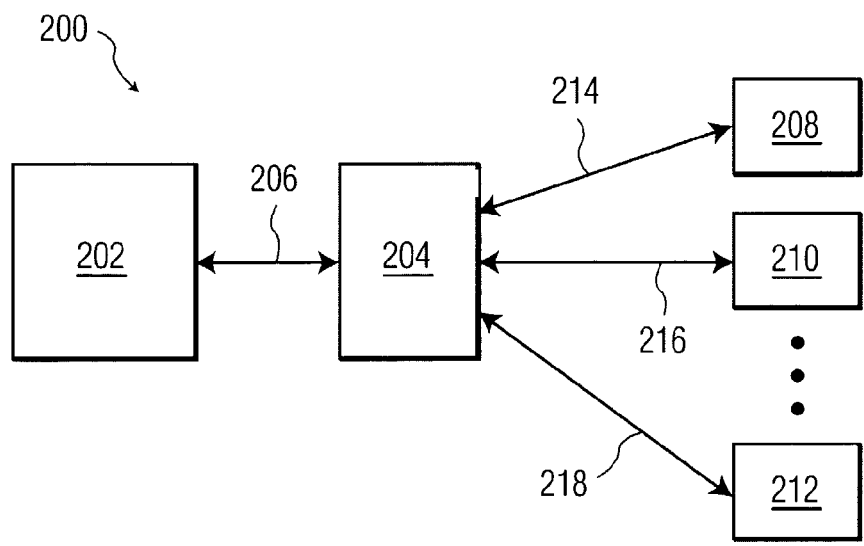
FIG. 2 is a block diagram of a system in an embodiment in accordance with the invention.

With reference to the figures and in particular with reference to FIG. 2, there is shown a block diagram of a system in an embodiment in accordance with the invention. System 200 includes USB apparatus 202 connected to USB-to-IDE adapter 204 via USB connection 206. USB connection 206 is a wired USB connection in one embodiment in accordance with the invention. In other embodiments in accordance with the invention, USB connection 206 is a wireless USB connection. Additionally, USB apparatus 202 is implemented as a USB host in one embodiment in accordance with the invention. In other embodiments in accordance with the invention, USB apparatus 202 is implemented as a USB device.

IDE devices 208, 210, 212 connect to adapter 204 via IDE connections 214, 216, 218, respectively. IDE devices 208, 210, 212 may be implemented as ATA devices, ATAPI devices, or a combination of both ATA and ATAPI devices. ATA devices use the Advanced Technology Attachment interface with storage devices such as disk or hard drives. ATAPI devices use the Advanced Technology Attachment Packet Interface with storage devices such as CD-ROM drives, DVD drives, tape drives, and removable storage disks. The ATA and ATAPI interfaces define the physical, transport, and command protocols for the storage drives.

Figure 3:
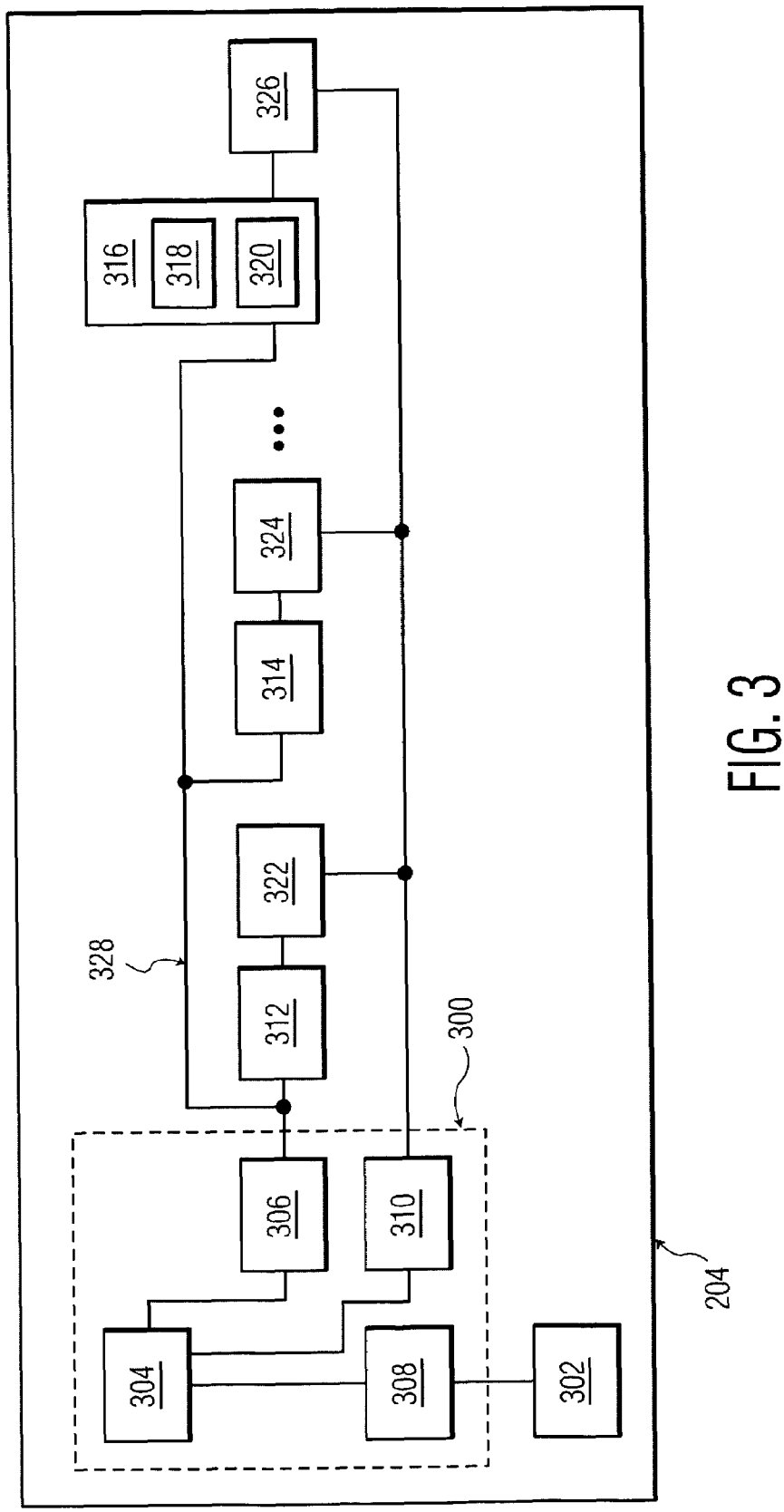
FIG. 3 is a block diagram of USB-to-IDE adapter 204 shown in FIG. 2.

USB-to-IDE adapter 204 is configured to allow multiple IDE devices to connect and communicate with USB apparatus 202. Adapter 204 receives and processes data from USB apparatus 202 and IDE devices 208, 210, 212 in an embodiment in accordance with the invention. FIG. 3 is a block diagram of USB-to-IDE adapter 204 shown in FIG. 2. Adapter 204 includes controller 300 and USB connector 302. Controller 300 includes microcontroller 304, device controller 306, USB function controller 308, and IDE function controller 310 in an embodiment in accordance with the invention.

Device controller 306, USB function controller 308, and IDE function controller 310 are implemented in a single integrated circuit in one embodiment in accordance with the invention. In other embodiments in accordance with the invention, device controller 306, USB function controller 308, and IDE function controller 310 may be implemented as discrete components or combined in any given configuration. Moreover, embodiments in accordance with the invention may include any number of microcontrollers, device controllers, USB function controllers, and IDE function controllers. For example, a USB-to-IDE adapter may include two or more IDE function controllers to allow for parallel processing of signals received from multiple IDE devices.

Device controller 306 is connected to IDE buffers 312, 314, 316. Buffer 316 illustrates one implementation for IDE buffers 312, 314, 316. Buffer 316 includes input buffer 318 and output buffer 320. Input buffer 316 and output buffer 318 are disabled to electronically isolate IDE connector 326 from device controller 306 in an embodiment in accordance with the invention. Buffers 312, 314, 316 may include any number of input and output functions in other embodiments in accordance with the invention. Moreover, embodiments in accordance with the invention may include any number of IDE buffers.

Connected to each IDE buffer 312, 314, 316 is IDE connector 322, 324, 326, respectively. In the embodiment of FIG. 3, device controller 306 includes glue logic to control (e.g., enable and disable) individual IDE buffers 312, 314, 316 via signal line 328. USB controller 308 is implemented as a USB function controller and microcontroller 304 supports USB device enumeration and block data transfer.

Figure 4:
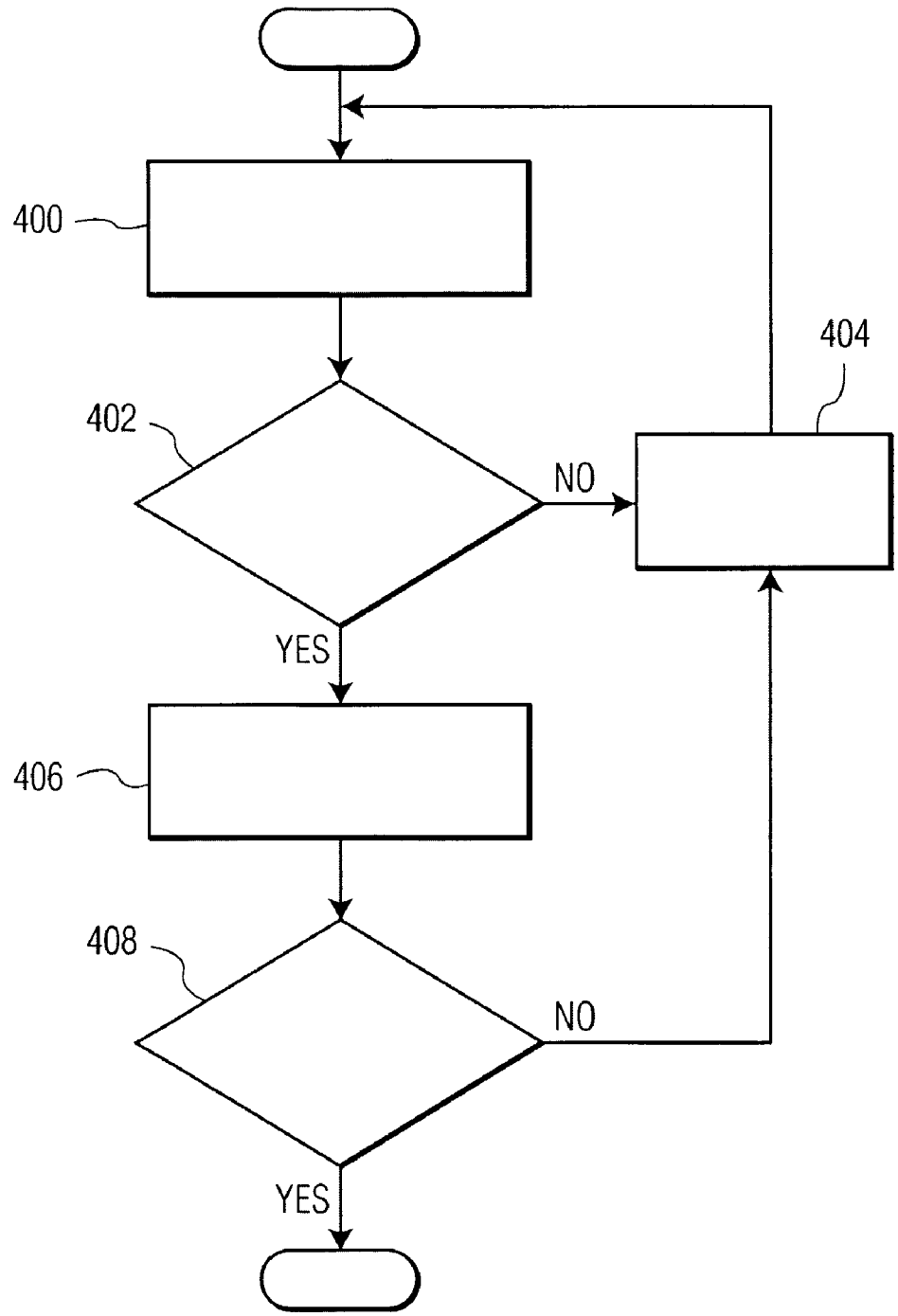
FIG. 4 is a flowchart of an initialization method for a USB-to-IDE adapter in an embodiment in accordance with the invention.

Referring to FIG. 4, there is shown a flowchart of an initialization method for a USB-to-IDE adapter in an embodiment in accordance with the invention. Initially the adapter polls an IDE connector, as shown in block 400. A determination is then made at block 402 as to whether an IDE device is connected to the IDE connector. If not, the process moves to the next IDE connector and then returns to block 400.

When an IDE device is connected to a connector, the method passes to block 406 where the IDE device is mapped into a device group according to its device type. An adapter can create any number of device groups for a device type. For example, an adapter creates four device groups in an embodiment in accordance with the invention. Two groups are associated with ATA devices while the other two groups are associated with ATAPI devices.

The USB-to-IDE adapter distributes the IDE devices into device groups in any given manner. For example, in an embodiment in accordance with the invention, the adapter distributes the devices into device groups evenly (or near evenly) in order to improve data throughput. This allows the adapter to parallel process command or status data transfers for other IDE devices when a data transfer for a particular IDE device is in process.

A determination is then made at block 408 as to whether all of the IDE connectors have been polled. If not, the process moves to the next connector (block 404) and repeats until all IDE connectors are polled.

Figure 5:
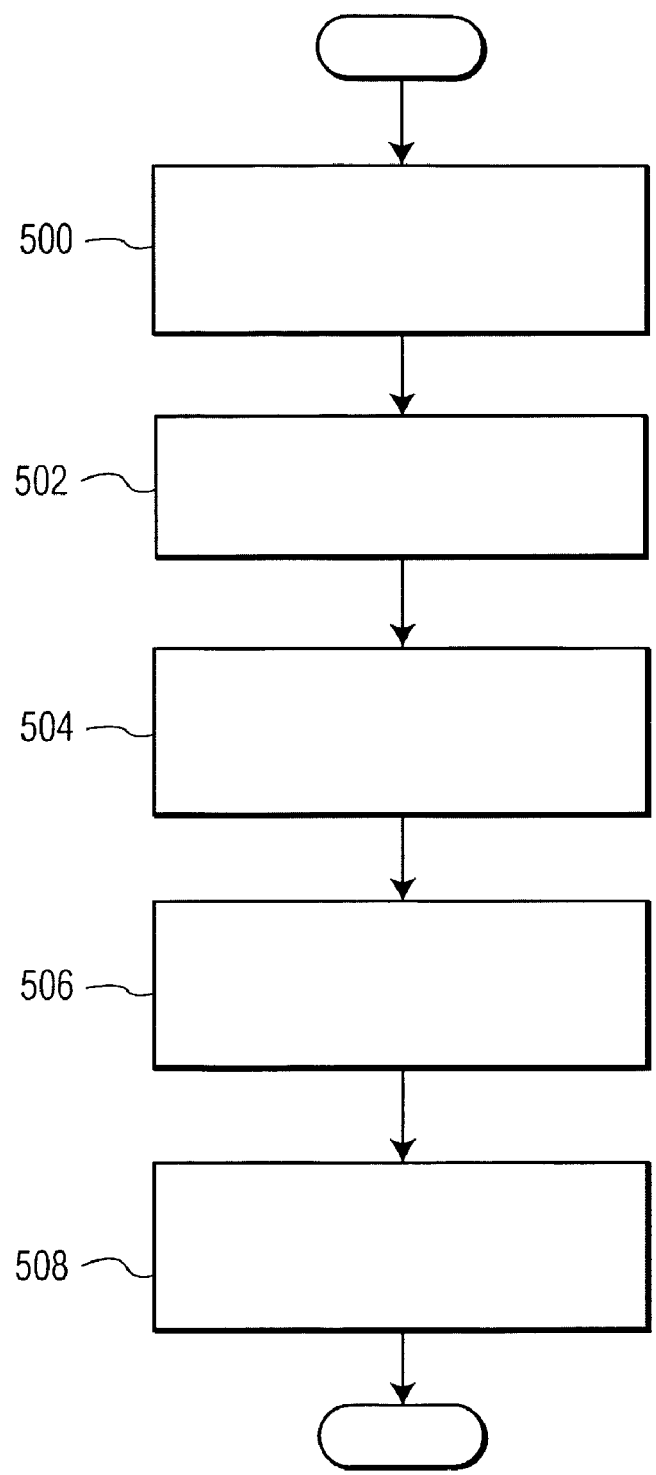
FIG. 5 is a flowchart of a method for connecting a USB-to-IDE adapter to a USB apparatus in an embodiment in accordance with the invention.

FIG. 5 is a flowchart of a method for connecting a USB-to-IDE adapter to a USB apparatus in an embodiment in accordance with the invention. When the USB-to-IDE adapter is initially connected to the USB apparatus, the adapter enumerates itself as a USB mass storage device with N device groups (block 500). The enumeration may be implemented, for example, with USB mass storage bulk-only transport descriptors. The number of device groups depends on the application. For example, as described in conjunction with FIG. 4, there are two device groups for ATA devices and two for ATAPI devices in an embodiment in accordance with the invention.

The adapter then reports to the USB apparatus the number of devices in each device group, as shown in block 502. A connection identifier is assigned to or associated with the USB connection between the USB apparatus and the USB-to-IDE adapter and unique device identifiers are assigned to or associated with each IDE device connected to the adapter (blocks 504, 506).

The connection identifier is implemented as a logic function number and the unique device identifiers as logic unit numbers in an embodiment in accordance with the invention. In other embodiments in accordance with the invention, the connection identifier, the device identifiers, or both the connection and device identifiers may be implemented with other types of identifiers.

Each unique device identifier is then associated with the connection identifier, as shown in block 508. The connection identifier and unique device identifiers are associated with each other by relating the identifiers in a mapping table in an embodiment in accordance with the invention. The connection identifier and unique device identifiers allow a USB apparatus to communicate with multiple IDE devices through a single USB connector and a single USB-to-IDE adapter.

Figure 6:
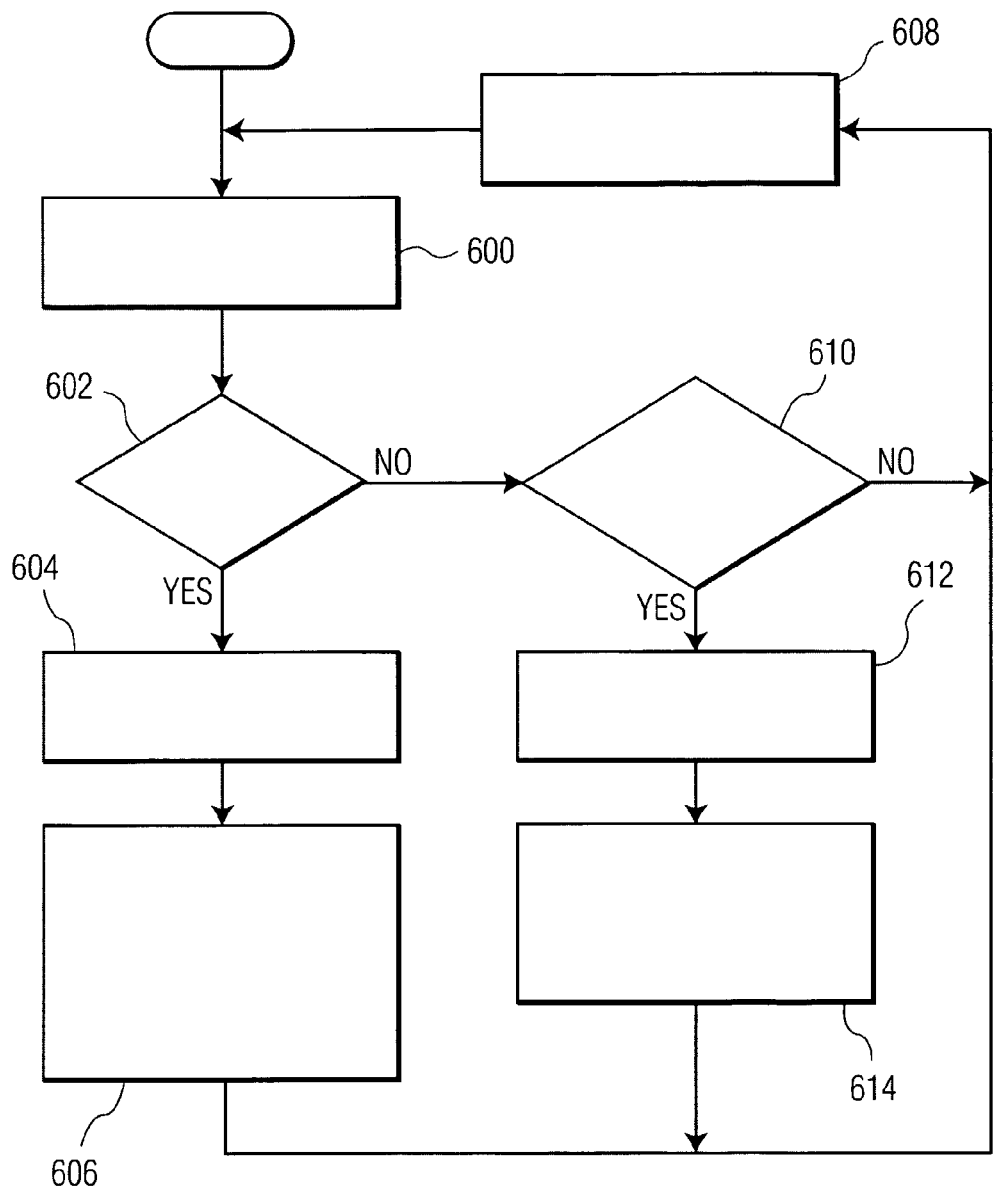
FIG. 6 is a flowchart of a method for connecting multiple IDE devices to a USB apparatus using an initialized USB-to-IDE adapter in an embodiment in accordance with the invention.

Referring to FIG. 6, there is shown a method for connecting multiple IDE devices to a USB apparatus using an initialized USB-to-IDE adapter in an embodiment in accordance with the invention. A USB apparatus polls an IDE connector at block 600 to determine whether an IDE device is connected to the IDE connector. In an embodiment in accordance with the invention, the adapter (e.g., microcontroller 304 in FIG. 3) transmits a "device not ready" message to the USB apparatus when an IDE device is not connected to an IDE connector. The USB apparatus polls the IDE connector continuously in response to the "device not ready" message in an embodiment in accordance with the invention.

A determination is then made at block 602 as to whether a new IDE connection has been established with the connector. If so, the process continues at block 604 where the IDE device is mapped into a device group based on its IDE type. A unique device identifier is then assigned to or associated with the IDE device and the unique identifier assigned to or associated with the connection identifier (block 606). The method then moves to the next IDE connector at block 608 and returns to block 600.

If it is determined at block 602 that a new IDE connection has not be established, the process passes to block 610 where a determination is made as to whether an existing IDE connection has been terminated. For example, the IDE device connected to a particular IDE connector may be disconnected from the adapter. If not, the method passes to the next IDE connector (block 608) and returns to block 600.

If an existing IDE connection is terminated, the process continues at block 612 where the IDE device is deleted from its assigned device group. The unique device identifier assigned to or associated with the IDE device as well as the association with the connection identifier are also deleted, as shown in block 614. The method then moves to the next IDE connector at block 608 and returns to block 600.

The IDE connectors are polled continuously in the embodiment of FIG. 6. Embodiments in accordance with the invention are not limited to this implementation. Polling of the IDE connectors may be implemented in any desired manner. For example, the IDE connectors may be polled at regular intervals or when a triggering event occurs, such as, for example, connecting an IDE device to an IDE connector.

What is claimed is:

1. An adapter to connect two or more IDE devices to a USB apparatus, the adapter comprising:
   a single USB connector;
   two or more IDE buffers;
   two or more IDE connectors, each of the two or more IDE connectors being connected to an individual one of the two or more IDE buffers; and
   a controller connected to the USB connector and to each of the two or more IDE connectors and operable to receive data from each of the two or more IDE connectors and the USB connector;
   wherein the controller includes logic to control the IDE buffers by enabling and disabling individual IDE buffers.

2. The adapter of claim 1, wherein the controller comprises a microcontroller.

3. The adapter of claim 1, wherein each IDE buffer includes one or more input buffers and one or more output buffers.

4. The adapter of claim 1, wherein the controller further comprises a device controller connected to the microcontroller and to each of the IDE buffers.

5. The adapter of claim 2, wherein the controller further comprises a USB function controller connected to the microcontroller and the USB connector.

6. The adapter of claim 2, wherein the controller further comprises an IDE function controller connected to each of the IDE connectors and to the microcontroller.

7. The adapter of claim 1, wherein the adapter is integrated within the USB apparatus.

8. The adapter of claim 1, wherein the adapter is implemented separately from the USB apparatus.

9. A system, comprising:
a USB apparatus;
two or more IDE devices; and
a USB-to-IDE adapter operable to connect to the USB apparatus and to the two or more IDE devices, said USB-to-IDE adapter including: two or more IDE connectors, and two or more buffers;
wherein each of the two or more IDE connectors is connected to an individual one of the two or more buffers; and
wherein a connection identifier is associated with a single USB connection between the USB apparatus and the USB-to-IDE adapter and a unique device identifier is associated with each IDE connection between each of the two or more IDE devices and the USB-to-IDE adapter;
wherein the USB-to-IDE adapter further includes: a USB connector; a USB function controller connected to the USB connector; an IDE function controller connected to each of the IDE connectors; a device controller connected to each of the IDE buffers; and a microcontroller connected to the device controller, the USB function controller, and the IDE function controller.

10. The system of claim 9, wherein each IDE buffer is comprised of one or more input buffers and one or more output buffers.

11. The system of claim 9, wherein the USB-to-IDE adapter is integrated within the USB apparatus.

12. The system of claim 9, wherein the connection identifier comprises a logic function number and each unique device identifier comprises a unique logic unit number.

13. The adapter of claim 1, wherein each of the IDE buffers is coupled between the corresponding IDE connector and the controller.

14. The adapter of claim 1, wherein, upon connection of the USB apparatus with the adapter, the adapter enumerates itself as a USB mass storage device with one or more device groups, each device group including one or more of the IDE devices.

* * * * *